(12) United States Patent
Connolly et al.

(10) Patent No.: US 8,630,800 B1
(45) Date of Patent: Jan. 14, 2014

(54) TRAVEL ROUTES INTERFACE

(75) Inventors: Emmet J. Connolly, Zurich (CH);
Marty R. Gardner, Melrose, MA (US);
Rani S. Manoharan, Cambridge, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/365,176

(22) Filed: Feb. 2, 2012

(51) Int. Cl.
*G01C 21/34* (2006.01)

(52) U.S. Cl.
USPC ........... 701/426; 701/438; 701/465; 701/533; 340/994; 340/995.14; 340/995.19; 340/995.24

(58) Field of Classification Search
USPC ......... 701/408–413, 425, 426, 438, 465–467, 701/527, 532, 533; 340/994, 995.1, 995.14, 340/995.19, 995.24
See application file for complete search history.

(56) References Cited

U.S. PATENT DOCUMENTS

| | | | | |
|---|---|---|---|---|
| 5,559,707 A * | 9/1996 | DeLorme et al. | ............. | 701/467 |
| 6,510,379 B1 * | 1/2003 | Hasegawa et al. | ............. | 701/533 |
| 7,805,241 B2 * | 9/2010 | Sato | ............................. | 701/417 |
| 7,809,360 B2 * | 10/2010 | Agrawal et al. | ............. | 455/414.1 |
| 7,864,073 B2 * | 1/2011 | Lee et al. | ....................... | 340/988 |
| 8,000,892 B2 * | 8/2011 | Banerjee | ....................... | 701/433 |
| 8,285,483 B2 * | 10/2012 | Amer-Yahia et al. | ......... | 701/428 |
| 8,352,179 B2 * | 1/2013 | French et al. | ................. | 701/410 |
| 8,364,395 B2 * | 1/2013 | French et al. | ................. | 701/410 |
| 2001/0020211 A1 * | 9/2001 | Takayama et al. | ............. | 701/200 |
| 2009/0119001 A1 * | 5/2009 | Moussaeiff et al. | .......... | 701/200 |
| 2009/0177373 A1 * | 7/2009 | Groenhuijzen et al. | ...... | 701/117 |
| 2010/0312464 A1 * | 12/2010 | Fitzgerald et al. | ............ | 701/200 |
| 2011/0112760 A1 * | 5/2011 | Serbanescu et al. | .......... | 701/204 |
| 2011/0166777 A1 * | 7/2011 | Chavakula | ..................... | 701/201 |
| 2011/0231091 A1 * | 9/2011 | Gourlay et al. | ............... | 701/204 |
| 2011/0270654 A1 * | 11/2011 | Banerjee et al. | ............. | 705/14.4 |

* cited by examiner

*Primary Examiner* — Russell Frejd
(74) *Attorney, Agent, or Firm* — Fish & Richardson P.C.

(57) ABSTRACT

Methods, systems, and apparatus, including computer programs encoded on a computer storage medium, for receiving a travel query, where the travel query comprises a starting location, a destination location, and a specified transit time; and using the starting location, destination location, and the specified transit time to provide a travel route for traveling from the starting location to the destination location within the specified transit time, wherein the travel route includes one or more points of interest.

17 Claims, 7 Drawing Sheets

TRAVEL ROUTES INTERFACE

BACKGROUND

This specification relates to providing information relative to a map. Users can use maps of geographic regions to identify travel routes. Conventionally, a user can make travel plans using hardcopy or web-based maps of a geographic location. In some instances, users can use web sites containing web-based maps to identify directions for travel (e.g., a particular travel route).

SUMMARY

This specification relates to providing information relative to a map. Users can obtain, from a system, travel routes for traveling from a starting location to one or more destination locations. The system can automatically provide one or more points of interest located along the travel route. The travel routes can be refined to include additional or fewer points of interest along the routes based on a specified transit time. Users can revise travel routes by filtering (e.g., removing) points of interest included in a travel route or by adjusting the amount of transit time available for traveling from a starting location to a destination location.

In general, one aspect of the subject matter described in this specification provides a user with the ability to submit a travel query that identifies a starting location, a destination location, and a specified transit time. A travel route for traveling from the starting location to the destination location within the specified transit time can be provided, including points of interest located along the travel route. The user can adjust the specified transit time to obtain a revised travel route. Increasing the transit time can result in one or more additional points of interest being added to the revised travel route. Decreasing a time period can result in one or more points of interest being removed from the revised travel route.

In some implementations, adjusting the specified transit time adjusts the amount of time that is recommended for visiting the points of interest, where the travel route and the points of interest that are located along the travel route remain unchanged. The user can de-select the points of interest provided with the travel route to obtain a revised travel route that replaces the de-selected points of interest with different points of interest. Points of interest to include in a travel route can be previously identified by the user, suggested by social contacts of the user, or identified by one or more different users.

In general, one aspect of the subject matter described in this specification can be embodied in methods that include the actions of receiving a travel query, where the travel query comprises a starting location, a destination location, and a specified transit time; and using the starting location, destination location, and the specified transit time to provide a travel route for traveling from the starting location to the destination location within the specified transit time, wherein the travel route includes one or more points of interest. Other embodiments of this aspect include corresponding systems, apparatus, and computer program products.

These and other embodiments can optionally include one or more of the following features. The starting location corresponds to a user location. The specified transit time is a user-specified transit time for traveling from the starting location to the destination location. The one or more points of interest are identified based in part on points of interest that were previously identified by the user. The one or more points of interest are identified based in part on points of interest suggested by social contacts of the user. The one or more points of interest are identified based in part on points of interest identified by one or more different users.

In general, one aspect of the subject matter described in this specification can be embodied in methods that include the actions of receiving a travel query, where the travel query comprises a starting location, a destination location, and a specified transit time; providing a first travel route for traveling from the starting location to the destination location within the specified transit time, wherein the first travel route includes one or more points of interest; receiving user input adjusting the specified transit time; and in response to the adjustment, providing a second travel route for traveling from the starting location to the destination location based in part on the adjusted specified transit time, wherein the second travel route includes one or more points of interest.

These and other embodiments can optionally include one or more of the following features. Adjusting the transit time comprises increasing a time period, and wherein one or more points of interest are added to the second travel route in response to the increased time period. Adjusting the transit time comprises decreasing a time period, and wherein one or more points of interest are removed from the second travel route in response to the decreased time period. The transit time is adjusted using a slider control. The transit time is adjusted by selecting a time period provided on a map interface. The transit time is adjusted by inputting a time period in an input field. The starting location corresponds to a user location. The specified transit time is a user-specified transit time for traveling from the starting location to the destination location. The one or more points of interest are identified based in part on points of interest that were previously identified by the user. The one or more points of interest are identified based in part on points of interest suggested by social contacts of the user. The one or more points of interest are identified based in part on points of interest identified by one or more different users.

In general, one aspect of the subject matter described in this specification can be embodied in methods that include the actions of receiving a travel query, where the query comprises a starting location, a destination location, and a specified transit time; providing a first travel route for traveling from the starting location to the destination location within the specified transit time, wherein the first travel route includes one or more points of interest; receiving user input de-selecting one or more points of interest provided with the first travel route; and in response to the de-selection, providing a second travel route for traveling from the starting location to the destination location, wherein the second travel route includes one or more different points of interest replacing the de-selected points of interest. Other embodiments of this aspect include corresponding systems, apparatus, and computer program products.

These and other embodiments can optionally include one or more of the following features. The method further includes receiving user input de-selecting one or more points of interest provided with the second travel route; and in response to the de-selection, providing a third travel route for traveling from the starting location to the destination location, wherein the third travel route includes one or more different points of interest in lieu of the de-selected points of interest.

Particular embodiments of the subject matter described in this specification can be implemented so as to realize one or more of the following advantages. Users having more travel time available than necessary to go from a starting location to a destination location can be provided with a travel route based on the available time and including one or more points of interest. Users can obtain travel routes for traveling from a starting location to one or more destination locations. The travel routes can include one or more points of interest located along the route. The travel routes can be refined to include additional or fewer points of interest along the routes based at least in part on a specified transit time. Users can revise travel routes by filtering (e.g., removing) points of interest included in a travel route or by adjusting the amount of transit time available for traveling from a starting location to a destination location.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
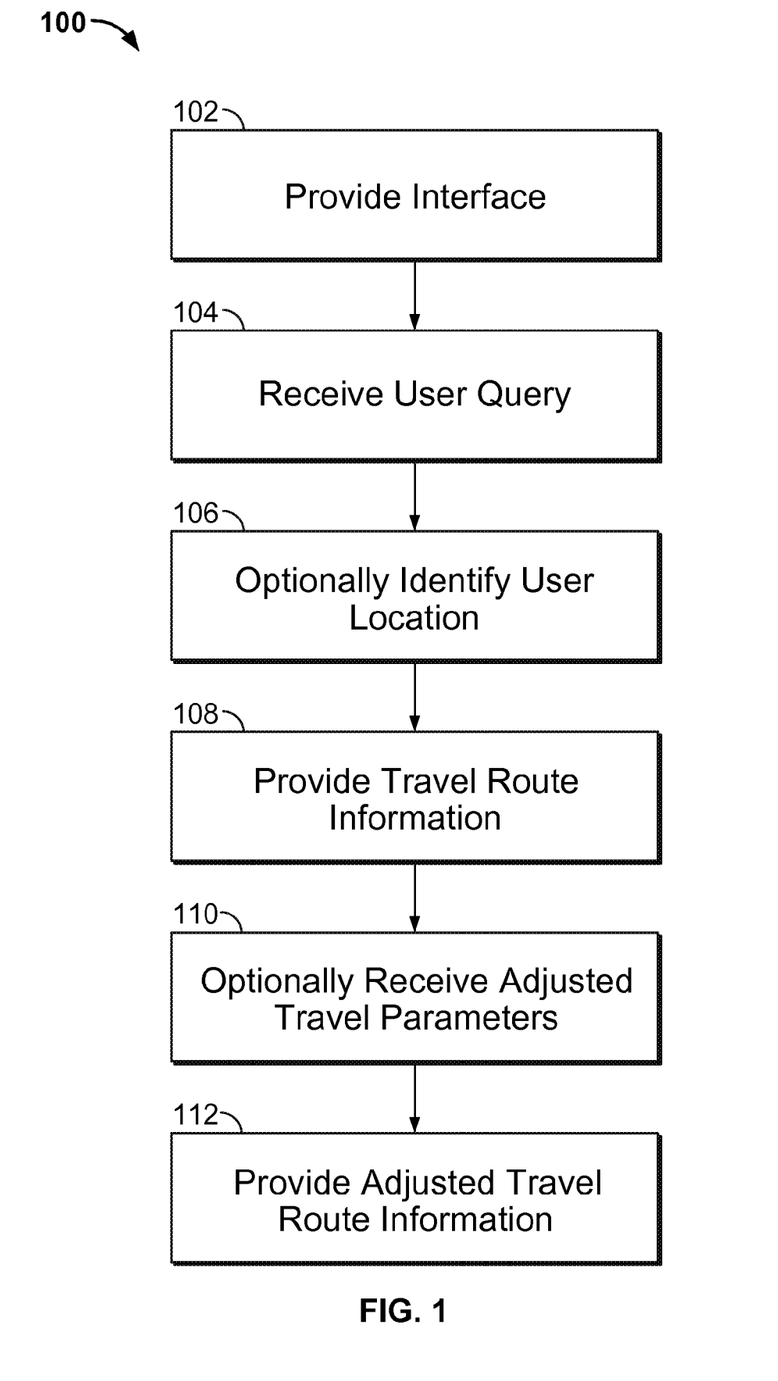
FIG. 1 is a flow diagram of an example process for providing travel routes.

FIG. 1 is a flow diagram of an example process 100 for providing tourist travel routes. For convenience, the process 100 will be described with respect to a system including one or more computing devices that performs the process 100.

The system provides a map interface (102). The map interface can be part of a separate travel route site or initiated through a particular map interface. The map interface can be accessed directly by the user, for example, by accessing a travel route search web page.

The map interface can include one or more search parameters. For example, the search parameters can include a starting location and one or more destination locations. The map interface can display a travel route for traveling from the starting location to one or more destination locations on a map corresponding to a geographic region encompassing the starting location and the one or more destination locations. In some implementations, the map interface displays points of interest on the map. In some other implementations, the map interface displays written directions for a travel route for traveling from the starting location to the one or more destination locations. In yet some other implementations, the map interface displays points of interest located along the travel route for traveling from the starting location to the one or more destination locations. The user can also define a transit time for traveling from the starting location to the destination locations. In some implementations, the transit time is defined based on the amount of time available for reaching the destination location (e.g., 30 minutes). In some other implementations, the transit time is defined based on an arrival time for reaching the destination location (e.g., arrive at destination by 8:00 pm).

The system receives input specifying travel route search parameters (104). For example, each of the travel route search parameters can have text fields, check boxes, drop down menus, slider controls, or a combination thereof, for receiving user input selecting particular parameter values. In some implementations, not all travel route search parameters need be specified in order to initiate a search. For example, only a destination location may be required to identify travel routes. Additionally, some search parameters may have default values that are used absent user modification. In some implementations, the starting location and/or the destination locations are specified using geographic address information. In some other implementations, the starting location and/or the destination locations are specified using names for points of interest. For example, the user can request a travel route starting from the Empire State Building and ending at the Statue of Liberty. Additionally, in some implementations, a starting location and/or destination locations are suggested based on some portion of input provided by the user. For example, a partial name can be used to suggest a starting location and/or destination locations.

In some implementations, the user can specify the amount of transit time that is available to travel from the starting location to the one or more destination locations. For example, the user can specify that they have 90 minutes available to travel from the starting location to the one or more destination locations. The travel route can be adjusted, such that the transit time for traveling from the starting location to the destination location, including the time for visiting the provided points of interest, does not exceed the specified transit time of 90 minutes. The transit time can be increased or decreased to obtain a travel route that includes more or fewer points of interest, respectively. In some implementations, the transit time is specified using an input field. In some other implementations, the transit time is specified using a slider control. In yet some other implementations, the transit time is specified by selecting a time period provided by the map interface.

The system optionally identifies a user location (106). In some implementations, the user specifies a starting location in an input field, where the specified starting location may or may not be the user's present location. In some other implementations, the starting location is identified automatically using the user's location. For example, the system can use Global Positioning System (GPS) information for a user device when the user enters "Current Location" in the input field.

The system provides travel route information (108). Travel route information can be determined, for example, through submission of the search parameters to a travel route search system. The system can provide a map interface that displays a map corresponding to a geographic region that includes a travel route for traveling from the starting location to the one or more destination locations. In some implementations, the travel route includes one or more points of interest located along the travel route. The provided travel route including the points of interest allows the user to their destination while also being able to tour the provided points of interest along the way.

In some implementations, the travel route provided by the system is a direct route (e.g., shortest route in travel time, distance, or both) for traveling from the starting location to the destination location that includes points of interest located along the direct route. In some other implementations, the travel route provided by the system is an indirect route (e.g., a route that is not necessarily the shortest route in travel time, distance, or both) for traveling from the starting location to the destination location. The travel routes provided by the system can vary depending on the points of interest included in the route or on the points of interest selected by the user.

The travel route can be provided in various forms, as described in greater detail below. For example, the travel route can be displayed on a map interface. The travel route can also be provided as written directions for traveling from the starting location to the destination locations. In some implementations, the interface provides a list of, or markers for, one or more points of interest that are located along the travel route. In various implementations the points of interest are based in part on points of interest that were previously identified by the user. In some other implementations, the obtained points of interest are based in part on points of interest suggested by social contacts of the user. In yet some other implementations, the obtained points of interest are based in part on points of interest identified by one or more different users.

The system optionally receives adjusted travel parameters (110). In some implementations, the user increases or decreases the amount of transit time that is available for traveling from the starting location to the destination location, where the number of points of interest included in the travel route can be increased or decreased, respectively. For example, the user may increase the transit time from 90 minutes to 120 minutes after deciding that the user has additional time to spare. By increasing the transit time, the user can obtain a revised travel route that includes additional points of interest. As a result, the user can travel along the revised travel route, visit the provided points of interest, and reach their destination in 120 minutes instead of the originally specified 90 minutes. In some implementations, the user adjusts the transit time while traveling along a travel route and, in response to the adjustment, the user obtains a revised travel route. For example, a user traveling along a route may decide that they have an additional 30 minutes to reach their destination. In this situation, the user can increase the transit time to obtain a revised travel route that can include additional points of interest. Similarly, a user traveling along a route may decide that they need to reach their destination 20 minutes earlier than originally predicted. In this situation, the user can decrease the transit time to obtain a revised travel route that can reduce the points of interest that are provided along the travel route.

The system provides adjusted travel route information (112). The system can provide a map interface that displays a revised travel route for traveling from the starting location to the one or more destination locations based in part on the adjusted travel parameters. In some implementations, increasing or decreasing the transit time results in the adjusted travel route including more or fewer points of interest, respectively.

In some implementations, the system provides a revised travel route for traveling from the starting location to the one or more destination locations using the original travel route search parameters. For example, a user can select a button (e.g., a "Find another route" button) to obtain a revised travel route using the same travel route search parameters (e.g., the same starting location, destination location, and transit time) that were used to obtain the original travel route. As a result of the selection, the system can provide a different travel route for traveling from the starting location to the one or more destination location. In some implementations, the revised travel route includes the same points of interest that were provided with the original travel route. In some other implementations, the revised travel route includes one or more different points of interest from the points of interest that were provided with the original travel route.

Figure 2:
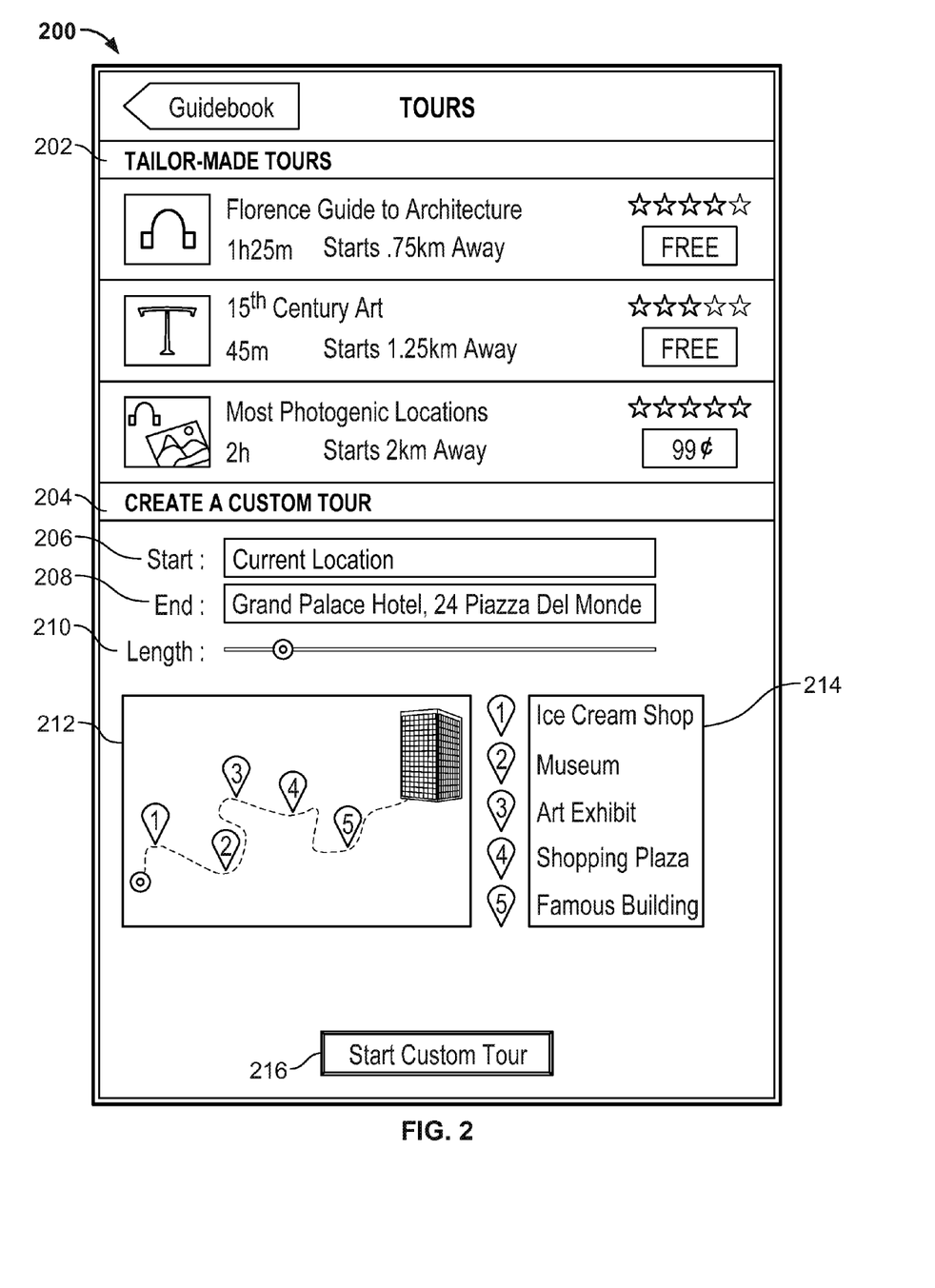
FIG. 2 is an example travel route map interface.

FIG. 2 is an example travel route map interface 200. The travel route map interface 200 optionally includes a first region 202 displaying tailor-made travel routes and a second region 204 for obtaining and displaying custom travel routes.

The first region 202 includes a list of tailor-made travel routes for regions nearby regions. The user can select one of the provided tailor-made travel routes to begin a travel route. The tailor-made travel routes can be available freely or for purchase.

The second region 204 includes an interface for obtaining and displaying custom travel routes. The second region 204 includes an input field 206 for entering a starting location and an input field 208 for entering a destination location. The input fields 206 and 208 are editable so that the user can modify the entered locations. In some implementations, the starting location and/or the destination locations are specified using geographic address information. In some other implementations, the starting location and/or the destination locations are specified using names for points of interest. Additionally, in some implementations, a starting location and/or destination locations are suggested based on some portion of input provided by the user. For example, a partial name can be used to suggest a starting location and/or destination locations.

The second region 204 also includes a transit time slider control 210 for adjusting the amount of transit time that is available traveling from the starting location to the destination location. For example, the transit time can be adjusted to increase or decrease the number of points of interest 214 included in the travel route. The second region 204 also includes a map region 212 for displaying the obtained travel route. The map region 212 can display a map of a geographic region along with a travel route for traveling from the starting location to the destination location. The map region 212 can indicate (e.g., using visual markers) points of interest located in the geographic region, including the points of interest 214 located along the travel route.

The second region 204 also includes a list of points of interest 214 that are located along the obtained travel route. Each point of interest can also be represented using a visual indicator (e.g., a balloon icon) on the map, along with a numerical identifier that indicates the sequence of the point of interest along the provided travel route. A button 216 for starting the custom travel route is also included. The user can select the button 216 to begin the custom travel route. In some implementations, selecting the button for starting the custom travel route displays a visual location indicator that indicates the location of the user on the map region. The location indicator can be updated to indicate the user's location as the user travels.

Figure 3:
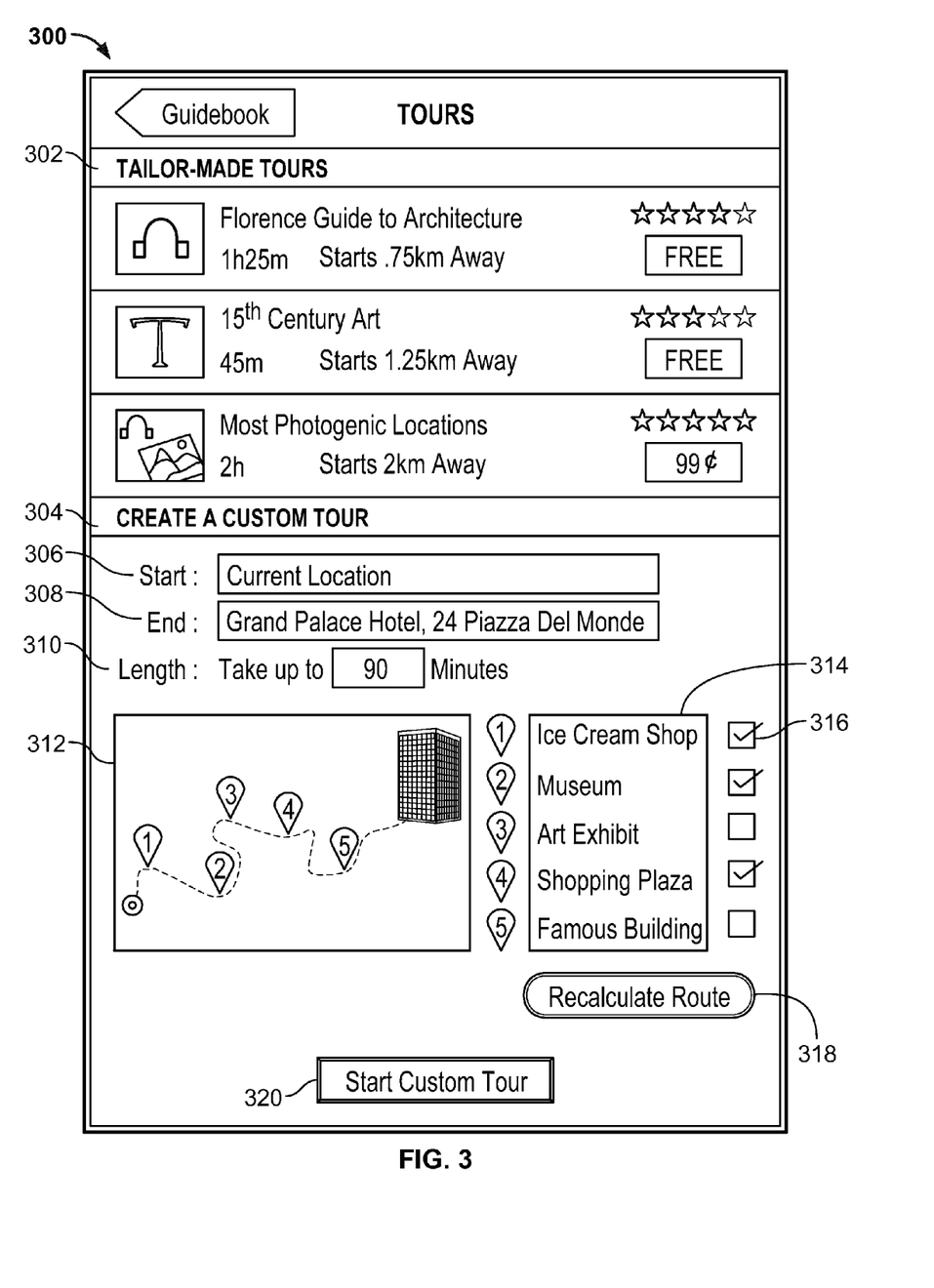
FIG. 3 is an example travel route map interface including a points of interest list.

FIG. 3 is an example travel route map interface 300 including a points of interest list 314. The travel route map interface 300 optionally includes a first region 302 displaying tailor-made travel routes and a second region 304 for obtaining and displaying custom travel routes. The first region 302 includes a list of tailor-made travel routes for regions. In some implementations, the tailor-made travel routes are available from a store for purchase and download. The user can select one of the provided tailor-made travel routes to begin a travel route. The tailor-made travel routes can be available freely or for purchase.

The second region 304 includes an interface for obtaining and displaying custom travel routes. The second region 304 includes an input field 306 for entering a starting location and an input field 308 for entering a destination location. The input fields 306 and 308 are editable so that the user can modify the entered locations.

The second region 304 also includes a transit time input field 310 for adjusting the amount of transit time that is available traveling from the starting location to the destination location. For example, the transit time can be adjusted to increase or decrease the number of points of interest 314 included in the travel route. For example, the user may increase the transit time from 60 minutes to 90 minutes after determining that there is additional time to spare. By increasing the transit time, the user can obtain a revised travel route that includes additional points of interest. In some implementations, the increasing or decreasing the transit time results in display of more or fewer points of interest that are located along the provided travel route, respectively. In some implementations, the transit time is specified as a minimum value and a maximum value to obtain a travel route with a transit time of no less than the minimum value and no more than the maximum value. In some implementations, the minimum value and the maximum value are specified using slider controls.

In some implementations, a slider control is used to specify the number of points of interests to be included in a travel route. For example, a user can be presented with a slider control that is labeled, for example, "fewer points of interest" on one end and "more points of interest" on the other end, and the user can move the slider control towards either end to specify, respectively, fewer or more points of interest to be included in a travel route.

The second region 304 also includes a map region 312 for displaying the obtained travel route. The map region 312 can display a map of a geographic region along with a travel route for traveling from the starting location to the destination location. The map region 312 can display points of interest for the geographic region, including one or more points of interest located along the travel route. The map displayed on the map region 312 can update when the user changes the transit time for traveling from the starting location to the destination location.

The second region 304 also includes a list of points of interest 314 that are located along the obtained travel route. Each point of interest can be represented using a visual indicator (e.g., a balloon icon) on the map, along with a numerical identifier that indicates the sequence of the point of interest along the provided travel route. A button 320 for starting the custom travel route is included. The user can select the button 320 to begin the custom travel route. In some implementations, a visual indicator of the user's location is displayed on the map region. In some other implementations, the visual indicator of the user's location is updated to provide the user's current location as the user travels.

Filtering parameters 316 can be used to refine the points of interest included in the travel route. For example, the user can use the filtering parameters 316 to de-select one or more points of interest from the list of points of interest 314 to obtain a revised travel route. A button 318 for recalculating the travel route based in part on the selection or de-selection of points if interest is included in the map interface 300.

Figure 4A:
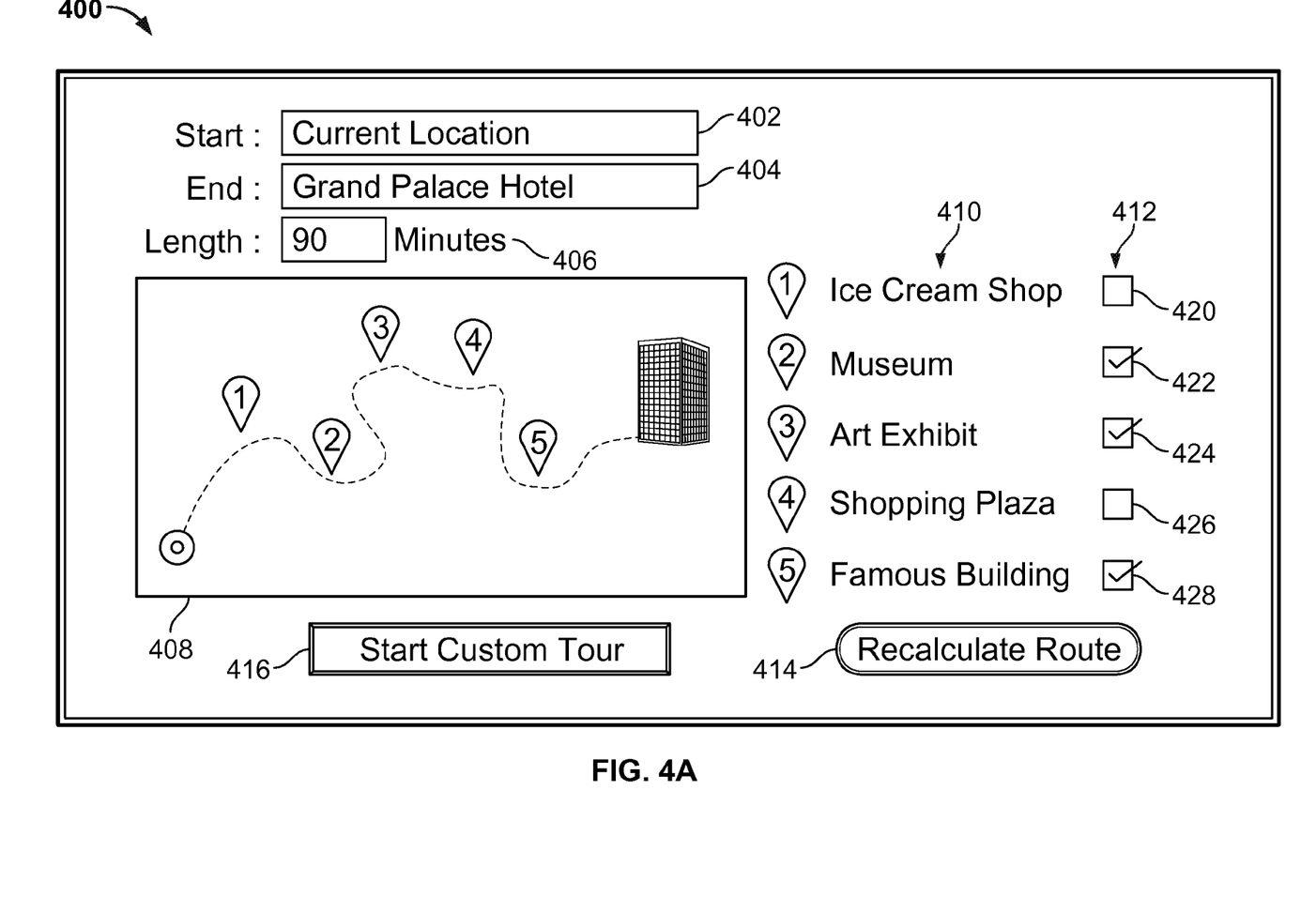
FIGS. 4A-4B are example travel route map interfaces illustrating travel route recalculation.

FIG. 4A is an example travel route map interface 400 illustrating travel route recalculation. The travel route map interface 400 includes an interface for obtaining and displaying custom travel routes. The map interface 400 includes an input field 402 for entering a starting location and an input field 404 for entering a destination location. The input fields 402 and 404 are editable so that the user can modify the entered locations. The map interface 400 also includes a transit time input field 406 for adjusting the amount of transit time for traveling from the starting location 402 to the destination location 404. The map interface 400 also includes a map region 408 for displaying the obtained travel route. The map region 408 can display a map of a geographic region along with a travel route for traveling from the starting location to the destination location. The map region 408 can display points of interest for the geographic region, including one or more points of interest 410 located along the travel route.

The map interface 400 also includes a list of points of interest 410 that are located along the obtained travel route. In some implementations, the user can select or de-select points of interest using the filtering parameters 412 to revise the travel route. For example, the user can use the filtering parameters 412 to de-select one or more points of interest from the list of points of interest 410 to obtain a revised travel route. In some implementations, the system replaces de-selected points of interest with different points of interest along the same travel route. In some other implementations, the system replaces de-selected points of interest with different points of interest along a revised travel route. A button 414 for recalculating the travel route based in part on the selection or de-selection of points if interest is included in the map interface 400. Moreover, a button 416 for starting the custom travel route is also included in the map interface 400. The user can select the button 416 to begin the custom travel route.

In FIG. 4A, the user has entered "Current Location" as the starting location in the input field 402 and has entered "Grand Palace Hotel" as the destination location in the input field 404. In some implementations, entering "Current Location" as the starting location causes the system to automatically obtain the user's position using global positioning information. The user has also entered 90 minutes in the transit time input field 406 as the amount of transit time that is available traveling from the starting location 402 to the destination location 404. Based on this information, the system obtains a travel route for traveling from the starting location 402 to the destination location 404, and provides the obtained travel route on the map region 408. The system also obtains points of interest 420, 422, 424, 426, and 428, which are located along the travel route and provides the obtained points of interest for display by a user device and, when displayed, presents the points of interest in the list of points of interest 410. In FIG. 4A, the user has de-selected points of interest 420 and 426 using the filtering parameters 412 to remove the de-selected points of interest from the travel route. In response to the de-selection, the user can select the button 414 to obtain a recalculated travel route that excludes the points of interest 420 and 426.

Figure 4B:
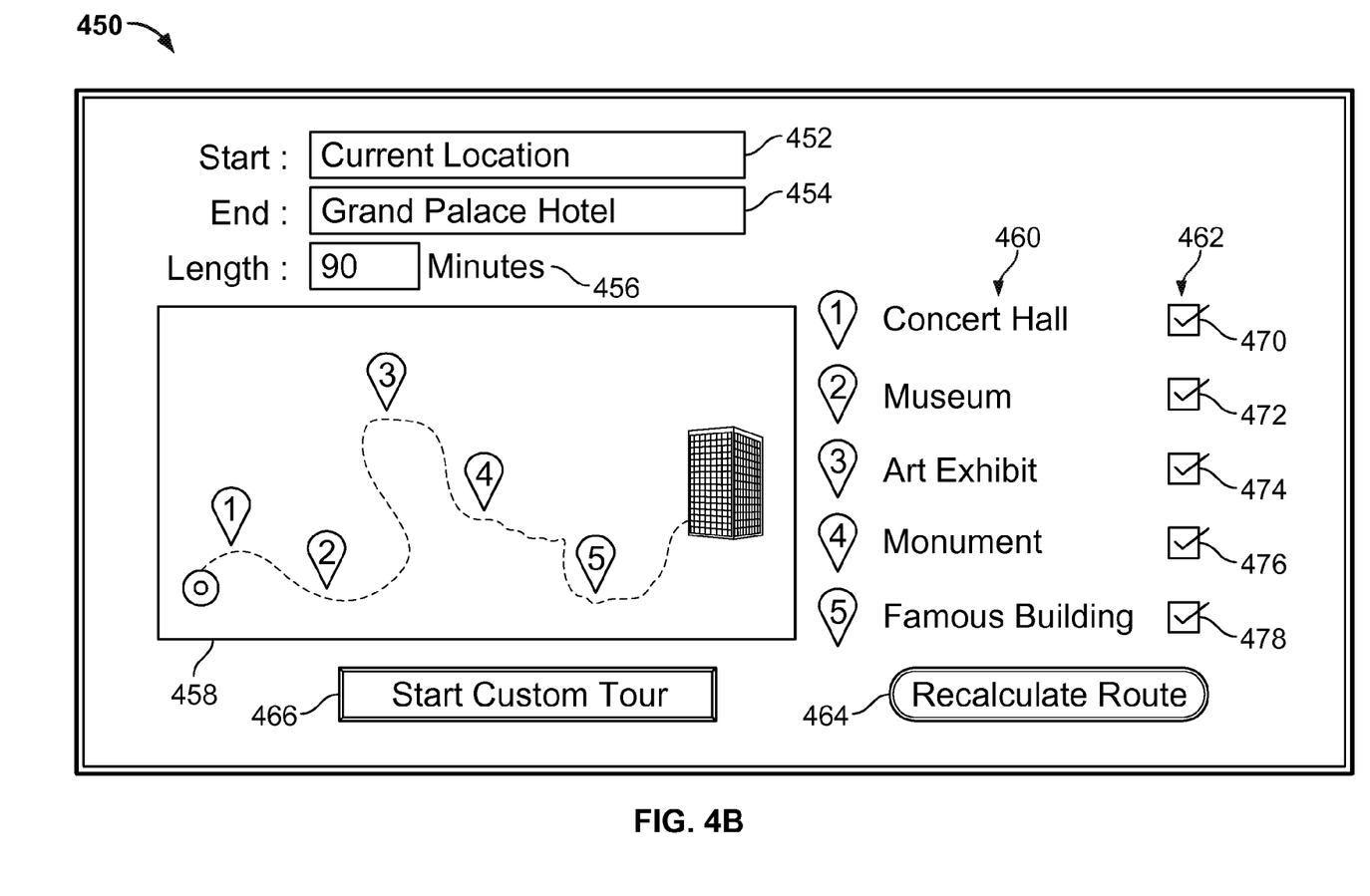

FIG. 4B is an example travel route map interface 450 illustrating travel route recalculation. The travel route map interface 450 includes an interface for obtaining and displaying custom travel routes. The map interface 450 includes an input field 452 for entering a starting location and an input field 454 for entering a destination location. The map interface 450 also includes a transit time input field 456 for adjusting the amount of transit time that is available traveling from the starting location 452 to the destination location 454. The map interface 450 also includes a map region 458 for displaying the obtained travel route. The map region 458 can display a map of a geographic region along with a travel route for traveling from the starting location to the destination location. The map region 458 can display points of interest for the geographic region, including points of interest 470, 472, 474, 476, and 478, which are located along the travel route.

The map interface 450 also includes a list of points of interest 460 that are located along the obtained travel route. A button 464 for recalculating the travel route based in part on a selection or de-selection of points if interest 460 is included in the map interface 450. Moreover, a button 466 for starting the custom travel route is also included in the map interface 450. The user can select the button 466 to begin the custom travel route.

In FIG. 4B, the system has provided a new travel route for traveling from the starting location 452 to the destination location 454 within the specified time period 456. In particular, the system has provided alternative points of interest 470 and 476 in response to the de-selection of points of interest 420 and 426 by the user, as shown in FIG. 4A.

Figure 5A:
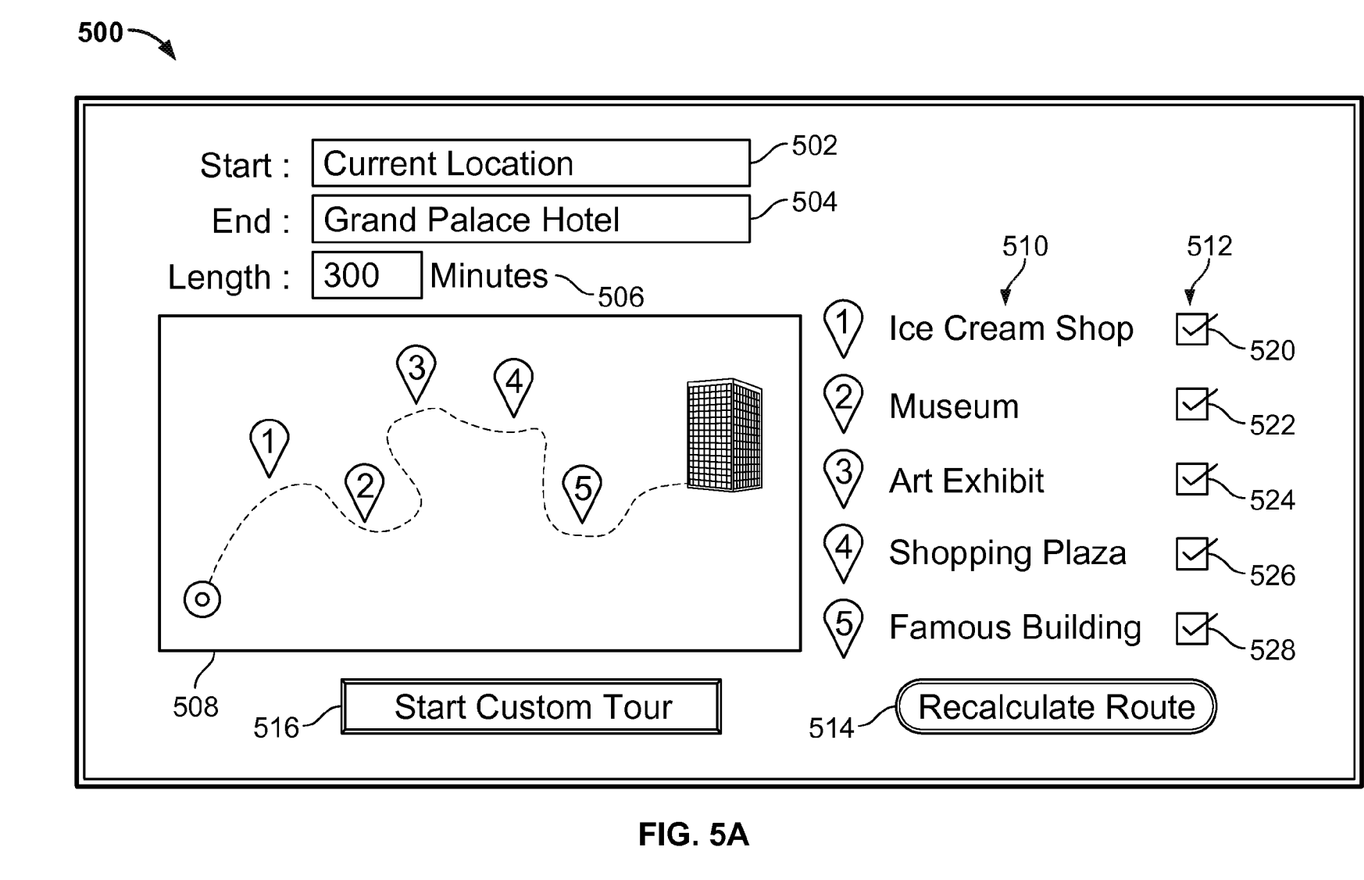
FIGS. 5A-5B are example travel route map interfaces illustrating travel route recalculation.

FIG. 5A is an example travel route map interface 500 illustrating travel route recalculation. The travel route map interface 500 includes an interface for obtaining and displaying custom travel routes. The map interface 500 includes an input field 502 for entering a starting location and an input field 504 for entering a destination location. The map interface 500 also includes a transit time input field 506 for specifying the amount of transit time that is available traveling from the starting location 502 to the destination location 504. The map interface 500 also includes a map region 508 for displaying the obtained travel route. The map region 508 can display a map of a geographic region along with a travel route for traveling from the starting location 502 to the destination location 504. The map region 508 can display points of interest for the geographic region, including points of interest 520, 522, 524, 526, and 528, which are located along the travel route.

The map interface 500 also includes a list of points of interest 510 that are located along the obtained travel route. A button 514 for recalculating the travel route based in part on an adjustment of the transit time entered in the transit time input field 506 is included in the map interface 500. Moreover, a button 516 for starting the custom travel route is also included in the map interface 500. The user can select the button 516 to begin the custom travel route.

In FIG. 5A, the user is seeking a travel route for traveling from a "Current Location" to the "Grand Palace Hotel." In particular, the user has specified 300 minutes in the transit time input field 506 as the amount of time available for traveling from the starting location to the destination location. Based on this information, the system obtains a travel route and displays the obtained travel route on the map region 508. The system also obtains points of interest 520, 522, 524, 526, and 528, which are located along the travel route, and displays the obtained points of interest in the list of points of interest 510.

Figure 5B:
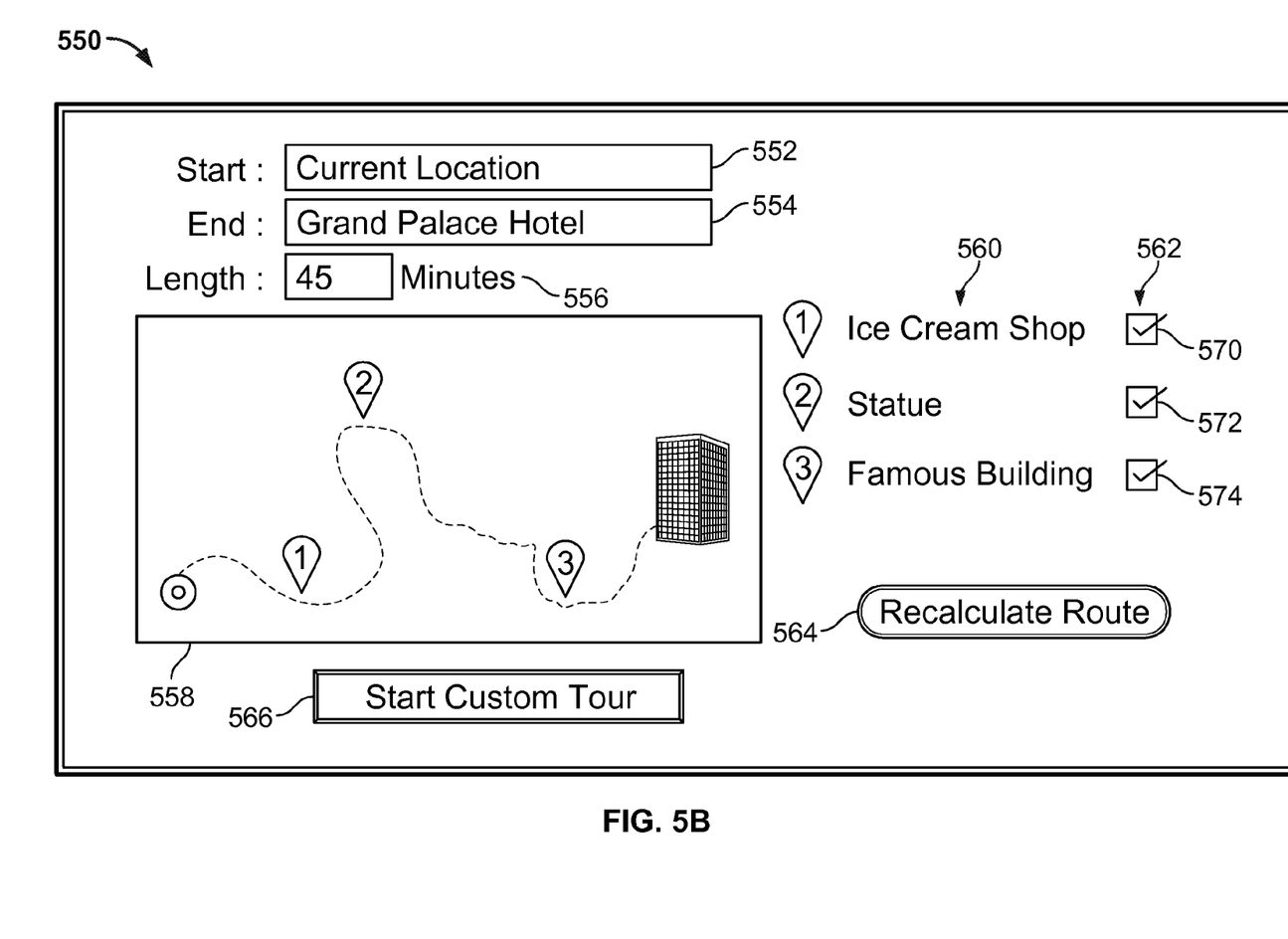

FIG. 5B is an example travel route map interface 550 illustrating travel route recalculation. The travel route map interface 550 includes an interface for obtaining and displaying custom travel routes. The map interface 550 includes an input field 552 for entering a starting location and an input field 554 for entering a destination location. The map interface 450 also includes a transit time input field 556 for adjusting the amount of transit time that is available traveling from the starting location 552 to the destination location 554. The map interface 550 also includes a map region 558 for displaying the obtained travel route. The map region 558 can display a map of a geographic region along with a travel route for traveling from the starting location 552 to the destination location 554. The map region 558 can display points of interest for the geographic region, including points of interest 570, 572, and 574, which are located along the revised travel route.

The map interface 550 also includes a list of points of interest 560 that are located along the obtained travel route. A button 564 for recalculating the travel route based in part on an adjustment of the transit time entered in the transit time input field 556 included in the map interface 550. Moreover, a button 566 for starting the custom travel route is also included in the map interface 550.

In FIG. 5B, the user has adjusted the transit time 556 for traveling from the starting location to the destination location from 300 minutes to 45 minutes. In response, the system has provided a revised travel route for traveling from the starting location 552 to the destination location 554 within 45 minutes. In particular, the system has reduced the number of points of interest 560 that were provided in connection with FIG. 5A to accommodate the user's reduced transit time.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, the method comprising:
   receiving, from a user, a travel query that comprises a starting location, a destination location, and a user specified transit time, wherein the user specified transit time is an amount of time available to the user for traveling from the starting location to the destination location;
   selecting, based on the starting location, the destination location, and the user specified transit time, one or more points of interests, each point of interest being associated with a respective recommended amount of time to visit the point of interest, wherein the one or more points of interest are selected so that an overall transit time for traveling a travel route from the starting location to the destination location and including the recommended amount of time to visit each of the one or more points of interest, is within the user specified transit time; and
   providing the travel route for traveling from the starting location to the destination location within the user specified transit time, wherein the travel route includes the one or more points of interest.

2. The method of claim 1, wherein the starting location corresponds to a user location.

3. The method of claim 1, wherein the one or more points of interest are identified based in part on points of interest that were previously identified by the user.

4. The method of claim 1, wherein the one or more points of interest are identified based in part on points of interest suggested by social contacts of the user.

5. The method of claim 1, wherein the one or more points of interest are identified based in part on points of interest identified by one or more different users.

6. A computer-implemented method, the method comprising:
   receiving, from a user, a travel query that comprises a starting location, a destination location, and a user specified transit time, wherein the user specified transit time is an amount of time available to the user for traveling from the starting location to the destination location;
   selecting, based on the starting location, the destination location, and the user specified transit time, one or more first points of interests, each point of interest being associated with a respective recommended amount of time to visit the point of interest, wherein the one or more first points of interest are selected so that an overall transit time for traveling a first travel route from the starting location to the destination location, and including the recommended amount of time to visit each of the one or more first points of interest, is within the user specified transit time;
   providing the first travel route for traveling from the starting location to the destination location within the specified transit time, wherein the first travel route includes the one or more first points of interest;
   receiving user input adjusting the specified transit time;
   in response to the adjustment, selecting, based on the adjusted user specified transit time, one or more second points of interests, each point of interest being associated with a respective recommended amount of time to visit the point of interest, wherein the one or more second points of interest are selected so that a duration for traveling a second travel route from the starting location to the destination location, and including the recommended amount of time to visit each of the one or more second points of interest, is within the adjusted user specified transit time; and
   providing the second travel route for traveling from the starting location to the destination location based in part on the adjusted specified transit time, wherein the second travel route includes the one or more second points of interest.

7. The method of claim 6, wherein adjusting the transit time comprises increasing a time period, and wherein one or more points of interest are added to the second travel route in response to the increased time period.

8. The method of claim 6, wherein adjusting the transit time comprises decreasing a time period, and wherein one or more points of interest are removed from the second travel route in response to the decreased time period.

9. The method of claim 6, wherein the transit time is adjusted using a slider control.

10. The method of claim 6, wherein the transit time is adjusted by selecting a time period provided on a map interface.

11. The method of claim 6, wherein the transit time is adjusted by inputting a time period in an input field.

12. The method of claim 6, wherein the starting location corresponds to a user location.

13. The method of claim 6, wherein the one or more first points of interest are identified based in part on points of interest that were previously identified by the user.

14. The method of claim 6, wherein the one or more first points of interest are identified based in part on points of interest suggested by social contacts of the user.

15. The method of claim 6, wherein the one or more first points of interest are identified based in part on points of interest identified by one or more different users.

16. A computer-implemented method, the method comprising:
   receiving, from a user, a travel query that comprises a starting location, a destination location, and a user specified transit time, wherein the user specified transit time is an amount of time available to the user for traveling from the starting location to the destination location;
   selecting, based on the starting location, the destination location, and the user specified transit time, one or more first points of interests, each point of interest being associated with a respective recommended amount of time to visit the point of interest, wherein the one or more first points of interest are selected so that an overall transit time for traveling a first travel route from the starting location to the destination location, and including the recommended amount of time to visit each of the one or more first points of interest, is within the user specified transit time;
   providing the first travel route for traveling from the starting location to the destination location within the specified transit time, wherein the first travel route includes the one or more first points of interest;
   receiving user input de-selecting one or more first points of interest provided with the first travel route;
   in response to the de-selection, selecting one or more second points of interests to replace the de-selected first points of interest, each point of interest being associated with a respective recommended amount of time to visit the point of interest, wherein the one or more second points of interest are selected so that an overall transit time for traveling a second route from the starting location to the destination location, and including the recommended amount of time to visit each of the one or more second points of interest, is within the user specified transit time; and providing the second travel route for traveling from the starting location to the destination location, wherein the second travel route includes the one or more different second points of interest.

17. The method of claim 16, further comprising:
receiving user input de-selecting one or more second points of interest provided with the second travel route; and
in response to the de-selection, providing a third travel route for traveling from the starting location to the destination location, wherein the third travel route includes one or more different points of interest in lieu of the de-selected points of interest.

\* \* \* \* \*